United States Patent [19]

Olson et al.

[11] Patent Number: 5,136,648
[45] Date of Patent: Aug. 4, 1992

[54] MESSAGE STORAGE SECURITY SYSTEM

[75] Inventors: Peter D. Olson, Santa Clara, Calif.;
Holley Taylor, Gainesville, Fla.;
Thomas Mandey, Sunnyvale, Calif.

[73] Assignee: Octel Communications Corporation, Milpitas, Calif.

[21] Appl. No.: 579,278

[22] Filed: Sep. 5, 1990

Related U.S. Application Data

[63] Continuation of Ser. No. 93,145, Sep. 2, 1987, abandoned, which is a continuation of Ser. No. 702,963, Feb. 19, 1985, abandoned.

[51] Int. Cl.$^5$ .................... H04L 9/00; H04M 1/64
[52] U.S. Cl. .................................. 380/50; 380/4; 380/21; 379/67; 379/68; 379/88
[58] Field of Search ............. 380/3, 4, 21, 23, 25, 380/28–30, 49, 50, 52, 53; 379/67, 68, 85, 87, 88, 89

[56] References Cited

U.S. PATENT DOCUMENTS

| | | | |
|---|---|---|---|
| H510 | 8/1988 | Clinch | 380/23 |
| 3,674,936 | 7/1972 | Wolfe | 380/49 |
| 4,228,321 | 10/1980 | Flanagan | 380/21 |
| 4,249,180 | 2/1981 | Eberle et al. | 380/28 X |
| 4,264,782 | 4/1981 | Konheim | 380/25 |
| 4,323,921 | 4/1982 | Guillou | 380/23 X |
| 4,326,098 | 4/1982 | Bouricius et al. | 380/25 |
| 4,349,695 | 9/1982 | Morgan et al. | 380/25 |
| 4,365,110 | 12/1982 | Lee et al. | 178/22.10 |
| 4,371,752 | 2/1983 | Matthews et al. | 179/18 B |
| 4,399,323 | 8/1983 | Henry | 178/22.13 |
| 4,439,636 | 3/1984 | Newkirk et al. | 179/18 B |
| 4,453,074 | 6/1984 | Weinstein | 178/22.11 |
| 4,476,349 | 10/1984 | Cottrell et al. | 179/18 B |
| 4,481,384 | 11/1984 | Matthews | 179/18 B |
| 4,585,906 | 4/1986 | Matthews et al. | 179/18 B |
| 4,626,623 | 12/1986 | LaHaye | 380/23 X |

Primary Examiner—Bernarr E. Gregory
Attorney, Agent, or Firm—Flehr, Hohbach, Test, Albritton & Herbert

[57] ABSTRACT

A voice message system having a plurality of user voice mailboxes is disclosed. The voice message system utilizes a method in which a message is encrypted using a unique encrypting key corresponding to a designated user. The encrypted message is then stored in one location while the encrypting key is stored in another location. The encrypted message is retrieved by the designated user by utilizing a decrypting key which corresponds to the stored encrypting key. The decrypted message is then played by the designated user.

4 Claims, 4 Drawing Sheets

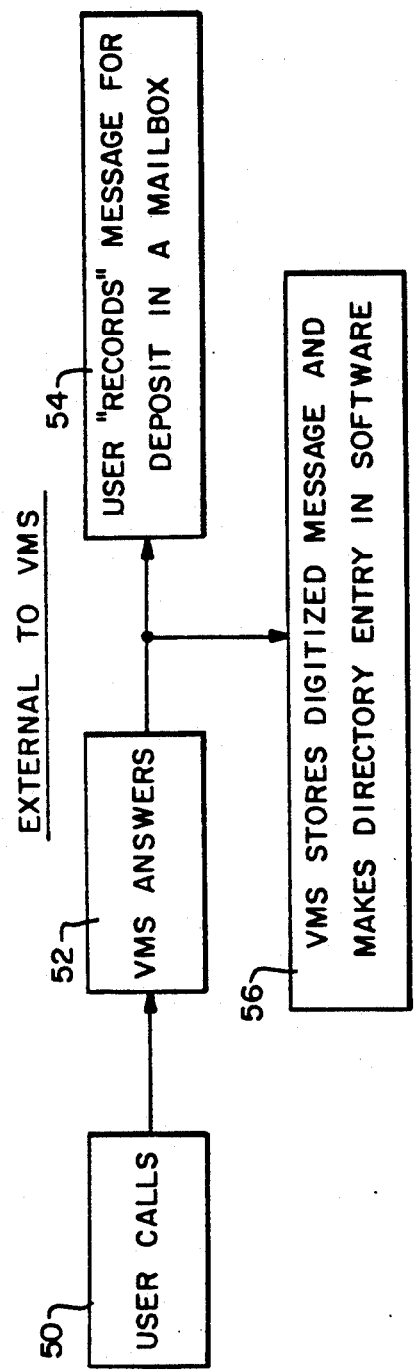
FIG.—2A
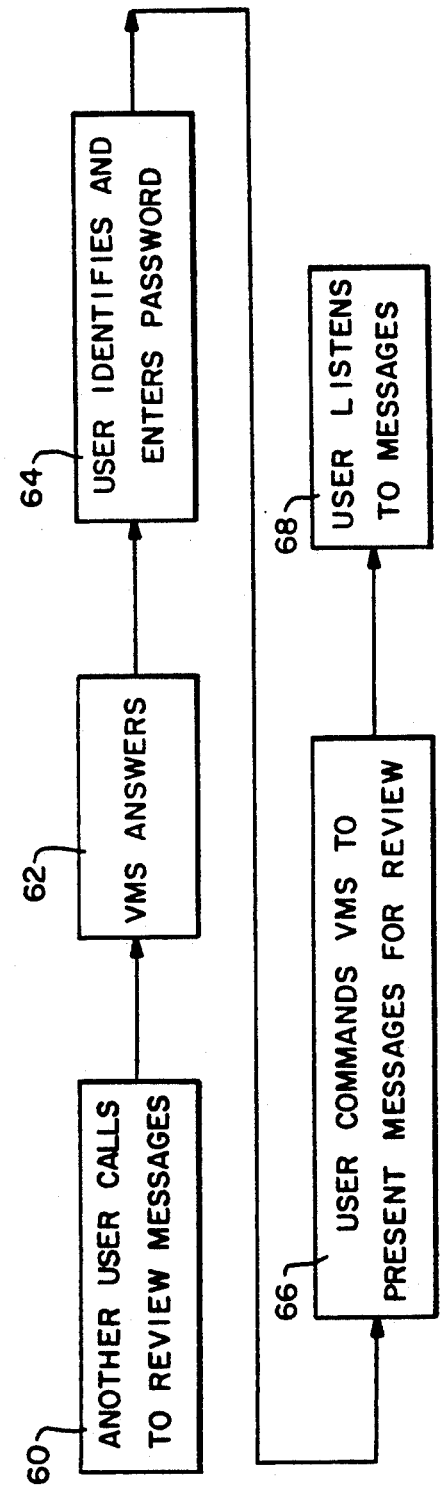
FIG.—2B

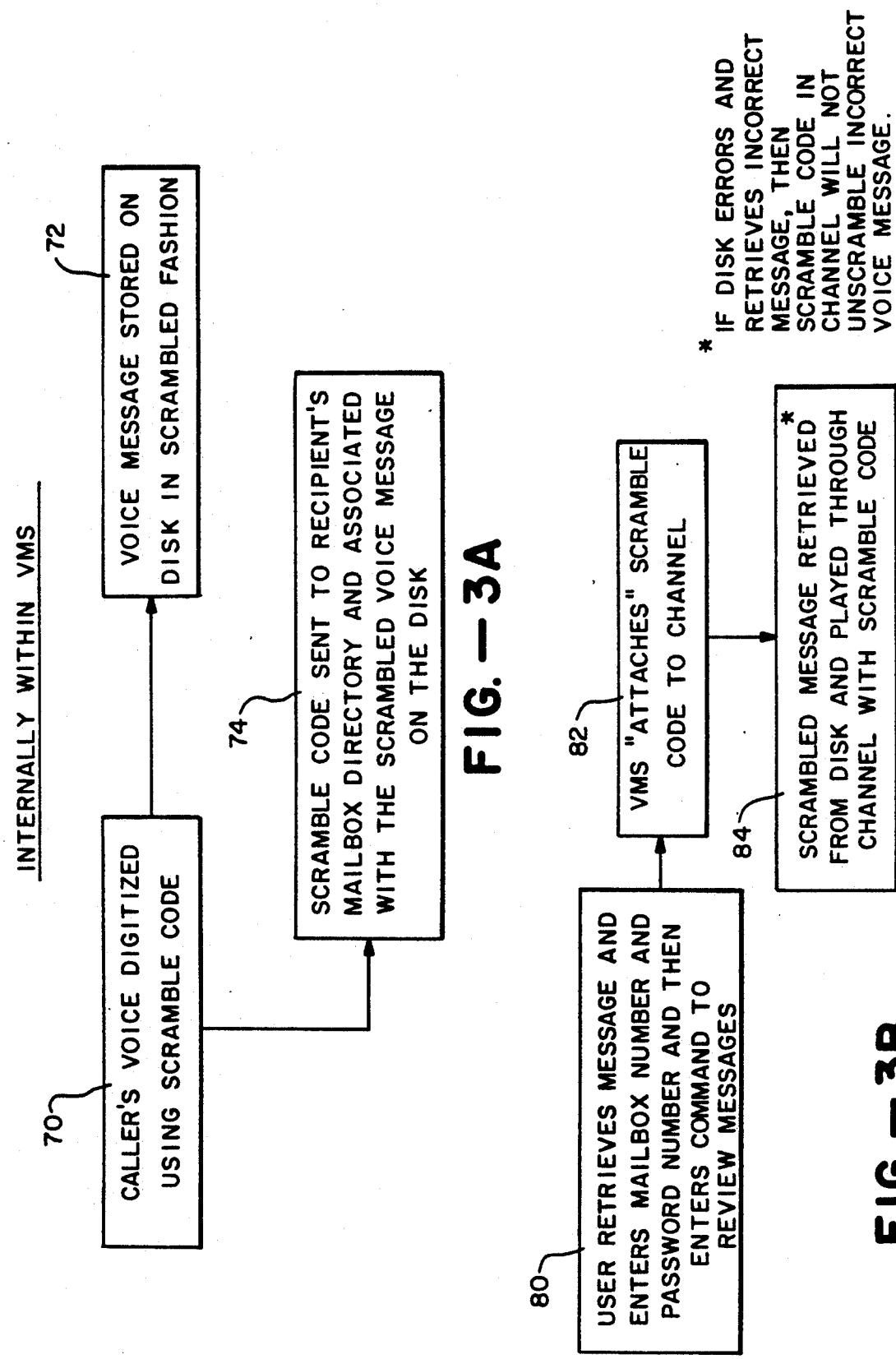

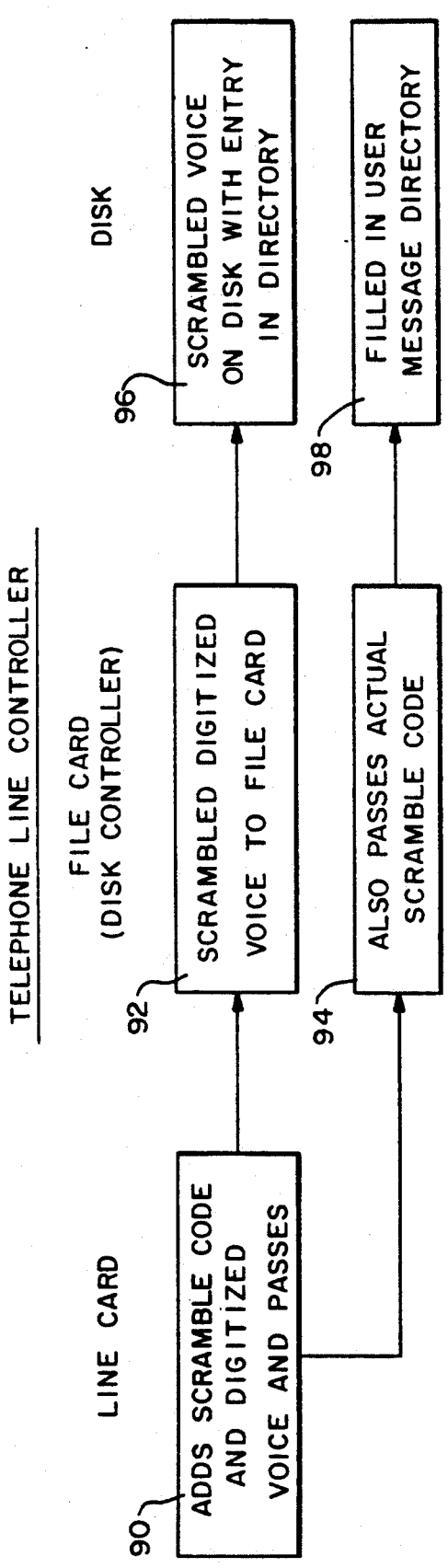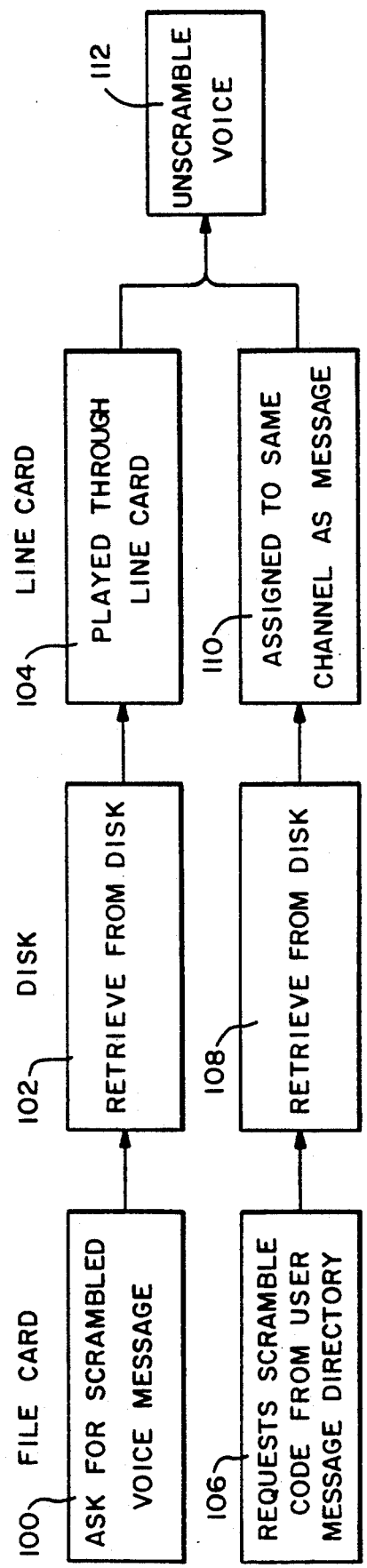

MESSAGE STORAGE SECURITY SYSTEM

This is a continuation of application Ser. No. 093,145, filed Sep. 2, 1987, now abandoned, which is a continuation of application Ser. No. 702,963, filed Feb. 19, 1985, now abandoned.

BACKGROUND OF THE INVENTION

The present invention relates to a voice message system (VM System) and more particularly to a message storage security system for use in the VM System.

In a voice message system (VM System), a calling party wishing to leave a message for another designated user, calls in to the VM System. The incoming voice message is digitized, stored on a disk, later retrieved by the designated user and converted back to voice. Most VM Systems enable several callers to transact with the system at the same time. When this happens, added measures are desirable to assure that message security is maintained.

For example, when a designated user A signs on the system and tries to receive his messages, it is very important that that user A get his and only his messages. The integrity of message security is vulnerable if, for example, the VM System system should fail in the processing of updating pointers on the disk which identify a particular user's message as his. The messages typically are stored on disk memory, and directory entries are placed in a location assigned specifically to that user. The directory entries are stored both in random access memory (RAM) and on disk memory. Vulnerability occurs if, in the process of writing the directory to the disk memory, a system failure occurs.

SUMMARY OF THE INVENTION

It is an object of the present invention to provide an improved message storage security system for use in a voice message system.

It is a more particular object of the present invention to provide for improved security so that a designated user of a VMS system has access to only his messages.

It is a further object of the present invention to provide an improved security system that will provide security to messages stored in the VM System in the event of a system failure.

Briefly, the invention provides for the unique encoding or encryption for a particular message for a designated user where the encoding key is stored on the designated user's message directory. For example, Message 1 for designated User A is scrambled using an encoding or encryption technique. The unique key that reverses the scrambling or encoding is stored on the user directory associated with Message 1 for designated User A. In a preferred embodiment, Message 2 for designated User A has a different encoding keythan for Message 1.

In a preferred embodiment, the storage of the encoding key is the last item to be posted for the user directory. Consequently, a system failure can occur at any time without availing any user's message to anyone else. For example, if a system failure causes User B's directory to point to a message that in reality belongs to User A, the encoding key (or more properly decoding key) will be incorrect. Consequently, the message that is being fetched will not play.

Similar protection is offered if the message disk should be copied and an attempt is made to play back all messages. It would then be necessary to know the encryption or encoding technique, which is stored in a different disk and processed with a separate circuit card than the card which processes disk activity. It would also be necessary to know which encoding and decoding keys are associated with which messages. This is a further security aspect of the present invention.

In accordance with the foregoing summary, the present invention achieves the object of providing an improved message storage security system for use in a voice message system (VM System). Other objects, features and advantages of the present invention will become apparent from the following detailed description when taken in conjunction with the accompanying drawings.

BRIEF DESCRIPTION OF THE DRAWINGS

FIGS. 2A and 2B depict the sequence of events external to the VM System of FIG. 1 according to the present invention.

FIGS. 3A and 3B depict the sequence of events internal to the VM System of FIG. 1 according to the present invention.

FIGS. 4A and 4B depict the sequence of events occurring in the telephone line controller, which forms a portion of FIG. 1.

DETAILED DESCRIPTION OF THE DRAWINGS

Figure 1:
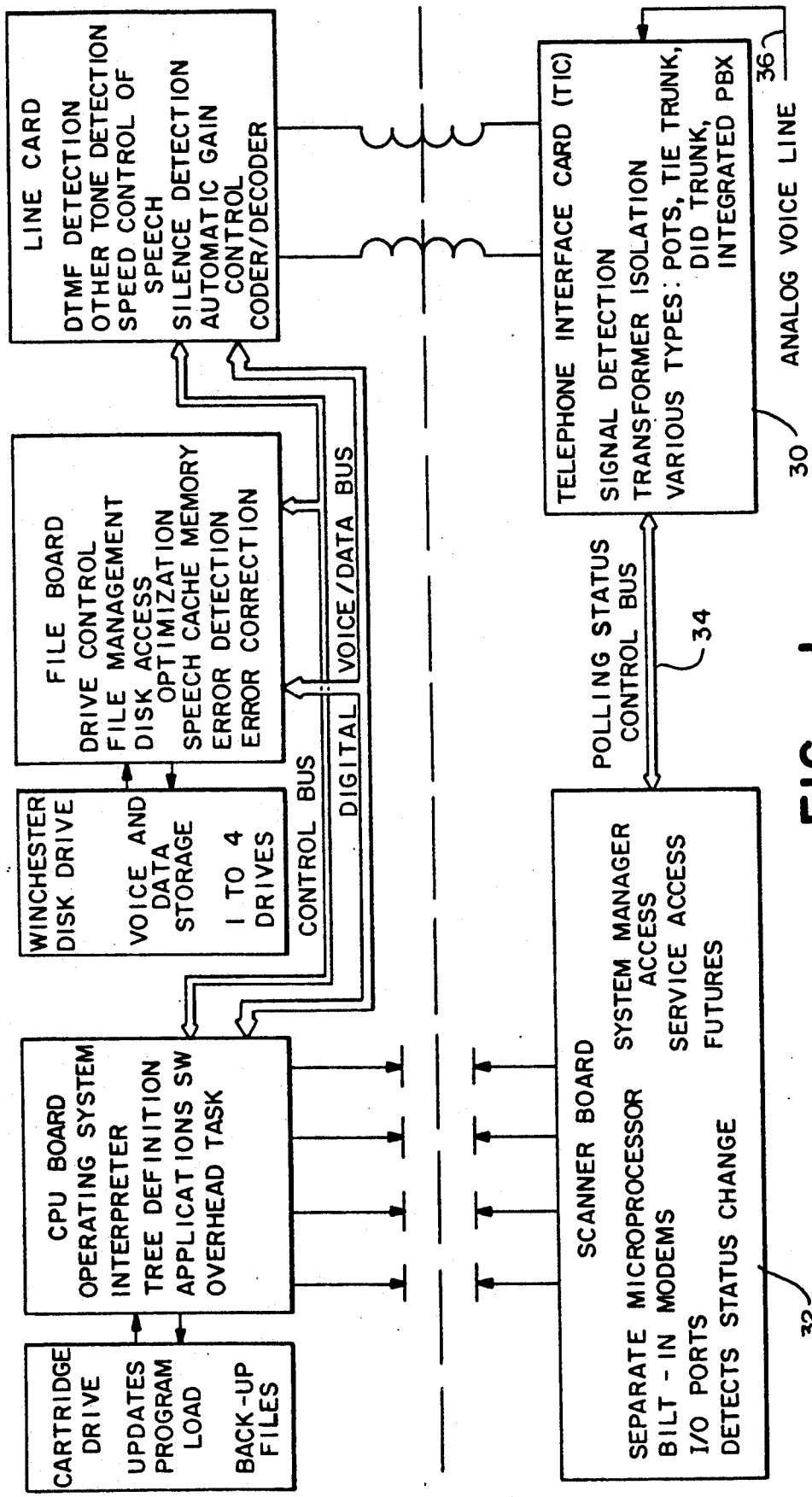
FIG. 1 depicts a block diagram of a voice message system (VM System).

Referring now to FIG. 1, a block diagram of a voice message system (VM System) is depicted. The present invention is incorporated into the VM System 10 of FIG. 1.

VM System 10 of FIG. 1 is shown with system hardware components for purposes of providing a general description of a VM System system. A suitable VM System such as depicted in FIG. 1 is manufactured by Octel Communications Corporation of San Jose, Calif. However, the present invention would be applicable to other types of VM System as well.

In FIG. 1, VM System 10 includes a CPU board 14 executes the operation system and the applications software. Typically, there are four serial I/O ports on CPU board 14 plus a standard disk interface to cartridge driver 12. CPU board 14 also interfaces with a control bus 16 and a digital voice/data bus 18. CPU board 14 is electrically isolated from input signals from any I/O device by passing all external signals through light-emitting diodes (optical path). CPU 14 can manage over twenty-four separate transaction channels simultaneously.

The file board 22 of FIG. 1 performs disk control functions for the Winchester drives 20. File board 22 also serves as a primary file manager in the system. File board 22 communicates with both CPU board 14 and line card 24. File board 22 handles both digitized voice and data and uses separate error correction and detection techniques for each, and is able to store both on the same disk.

File board 22 has standard interfaces with Winchester disk drives 20, and is connected to control bus 16 and digital voice/data bus 18.

Line card 24 of FIG. 1 has four channels, with each channel associated with a channel on a telephone interface card (TIC) 30. Only one TIC is associated with a line card 24. Line cards 24 are connected to control bus 16 and to digital voice/data bus 18. Line card 24 performs the functions of voice digitizing; tone detection, including dual tone multifrequency (DTMF) detection; silence detection; automatic gain control and multiplexing. Also, line card 24 provides speed control over the speed of speech playback.

The telephone interface card (TIC) 30 provides FCC-approved interfaces (Part 68) to either the public switched network (including Centrex) or to a customer's PBX. TIC 30 provides signaling detection; transformer isolation of various types such as Plain Old Telephone Service (POTS); tie trunk; DID trunk and integrated PBX.

The scanner board 32 of FIG. 1 includes integral modems, an analog switch, an internal TIC function, a tone generator for testing, conference circuits and four serial I/O ports which optically connect to the serial I/O ports of CPU port 14. Winchester disk drive 20 of FIG. 1 stores system software, files and directories, digitized voice prompts and provides storage of digitized voice messages in personal greetings.

Cartridge disk drive 12 of FIG. 1 accepts a 5-megabyte cartridge and provides software updates including new feature additions, system enhancements and the like.

The digital voice/data bus 18 is a high speed serial bus used to transfer large amounts of both voice and data. Digitized voice can be sent at greatly accelerated speeds to buffers and played back at a listener's normal speed.

Control bus 16 of FIG. 1 is a second high speed serial bus designed to automatically transfer small packets of control information. It processes large numbers of these packets while consuming very little overhead.

The polling status control bus 34 of FIG. 1 interconnects the scanner board 32 and TIC 30. Control bus 34 operates on a polled basis under control of scanner board 32.

VM System 10 of FIG. 1 maintains a system directory (customer data base) of all user "mailboxes" with their associated class of service and associated passwords. There is no access to password information by a system manager or other technicians as the resident software makes passwords inaccessible. Every subscriber (user) has his own directory which contains information about messages in their "mailbox." VM System 10 of FIG. 1 also maintains message directories which tell where the various messages in the system are stored (i.e., which disk and where on each disk). All directory information is stored on both software/storage disks in disk drive 20 and cartridge disk drive 12.

The hardware components of FIG. 1 have been described in order to simplify the description of the present invention, which is directed toward a message storage security system and which will now be described in detail in conjunction with FIGS. 2-4, taken with reference to the block diagram of FIG. 1.

FIGS. 2A and 2B depict the sequence of events occurring externally to VM System 10 of FIG. 1. In FIG. 2A, a user will call in to the VM System of FIG. 1 and in normal operation the VM System answers, as indicated at step 52. In typical VM System operation, the user (caller) records a message for deposit in a designated user's mailbox, as indicated in step 54 of FIG. 2A. VM System 10 of FIG. 1 stores the digitized message and makes a directory entry into the software as indicated by steps 56 of FIG. 2A.

Subsequently, another user (the designated user) calls in to review any messages for him as indicated in FIG. 2B at step 60. The VM System answers the designated user's inquiry at step 62 and at step 64 the designated user identifies himself and enters his password into the VM System.

At step 66, the designated user commands the VM System to present any messages for his review, and at step 68 the user listens to any messages.

The sequence of events illustrated in FIGS. 2A and 2B is typical operation well known in VM Systems.

Referring now to FIGS. 3A and 3B, the sequence of events occurring internally within VM System 10 of FIG. 1 is depicted.

In FIG. 3A, the caller's voice is digitized by VM System 10 of FIG. 1. In step 70, the voice is digitized using a unique scramble code so that the message is scrambled, encoded or otherwise encrypted. The particular encoding technique could be any one of a number of well known techniques for encoding information. For purposes of this description, the term "encoded" is intended to encompass other similar terms such as "scrambling," "encrypting" and other known terms. Similarly, the corresponding "decoding" of a scrambled word is intended to include, in terms of meaning, "decrypting," "descrambling" and the like.

In FIG. 3A, the encoded or scrambled message is stored by Vm System 10 of FIG. 1 in Winchester disk drive 20 (in typical operation). This is indicated by step 72.

Also, in FIG. 3A, the encoded or scrambled code is set to the designated user's (recipient's) mailbox directory, and associated with the scrambled voice message on disk drive 20 of FIG. 1. This is indicated by step 74 of FIG. 3A.

In FIG. 3B, the designated user desires to retrieve his messages and enters his mailbox number and password number into VM System 10 of FIG. 1, and then enters a command to review any messages waiting for him. This is indicated by step 80. Subsequently, at step 82, VM System 10 of FIG. 1 "attaches" the scrambled code to a channel to connect the message to the user. At step 84, the scrambled encoded message is retrieved from disk drive 20 and played through the channel with the scrambled code. This is indicated in step 84.

One important note is that if any disk errors occur or the system retrieves an incorrect message, the scrambled code in the channel will not be unscrambled, and consequently there will not be any playing of unauthorized voice messages to a non-designated user. This is a security aspect of the present invention.

Referring now to FIG. 4A, the sequence of events occurring in conjunction with the telephone line controller of FIG. 1 is depicted.

In FIG. 4A, line card circuit 24 of FIG. 1 adds a scramble code and digitizes the voice message, as indicated at step 90.

At step 92, line card circuit 24 passes the scrambled digitized voice to file board circuit 22. This is indicated at step 92.

Line card circuit 24 of FIG. 1 also passes the actual scramble code to file card circuit 22, as indicated at step 94 of FIG. 4A.

Finally, disk drive 20 of FIG. 1 receives the scrambled voice and the encoded message is stored in disk drive 20 of FIG. 1.

Similarly, as indicated by step 98, the scrambled code is filed in a user message directory.

FIG. 4B illustrates the sequence of events occurring when the user is obtaining his message for playback. In FIG. 4B, file card circuit 22 responds to the request for scrambled voice message, as indicated by step 100, and retrieves the scrambled voice message from disk drive 20, as indicated by step 102.

At step 104, the retrieved message is played back through line card circuit 24 of FIG. 1.

Step 106 of FIG. 4B illustrates that file card 22 requests the scramble code from the user message directory.

At step 108, the scrambled code is retrieved from disk drive 20, and at step 110 the scrambled code is assigned to the same channel as the scrambled message via line card 24.

Finally, at step 112, the unscrambled voice message is available through line card 24 to telephone interface card 30 for playback to the designated user via analog voice line 36 of FIG. 1.

As can be seen from the foregoing description, a message storage security system for use in a voice message system has been described. The technique and method described herein provide improved security aspects in a voice message system. The security provided only permits a designated authorized user to have access to his or her recorded messages by using encoding or scrambling techniques in a particular fashion. Also, in the event of a system failure, such as when a user's directory points to a different user because the encoding keys are totally different, there is no unauthorized playback of a particular message.

It is therefore intended that the scope of the present invention only be limited by the appended claims.

What is claimed is:

1. In a voice message system having a plurality of user voice mailboxes, the method comprising the steps of
    encrypting messages designated for a plurality of designated users using a unique encrypting key for each of said users,
    storing the encrypted messages,
    separately storing the unique encrypting keys from said encrypted messages,
    decrypting the stored messages when instructed by each of said designated users using decrypting keys corresponding to said stored encrypting keys for each of said users, and
    playing the decrypted messages to said designated users.

2. In a voice message system having a plurality of user voice mailboxes, the method comprising the steps of
    encrypting messages intended for designated users of said system, using unique encrypting keys corresponding to each of said designated users, including encrypting a plurality of messages for said designated user of said system with different unique encrypting keys for each of said plurality of messages,
    storing the encrypted messages,
    separately storing the unique encrypting keys from said encrypted messages,
    decrypting the stored encrypted messages when instructed by each of said designated users, using decrypting keys corresponding to each of said stored unique encrypting keys,
    playing the decrypted messages to said respective designated users.

3. The method of claim 2 including the step of decrypting the plurality of encrypted stored messages using a different unique decrypting key for each of said stored encrypted messages.

4. In a voice message system having a plurality of user voice mailboxes, the method comprising the steps of
    encrypting a first message intended for a first designated user of said system, using a first unique encrypting key corresponding to said first designated user,
    storing the first encrypted message,
    separately storing said first unique encrypting key from said first encrypted message,
    decrypting the stored encrypted message when instructed by said designated users, using a decrypting key corresponding to said stored unique encrypting key,
    playing the first decrypted message,
    encrypting a second message designated for a second, different user using a second unique encrypting key corresponding to said second designated user,
    storing the second encrypted message,
    separately storing the said second unique encrypting key from said second encoded message,
    decrypting the second encrypted message using a second decrypting key corresponding to said stored second encrypting key, and
    playing the second decrypted message to said respective designated users.

* * * * *